United States Patent
Hu

(10) Patent No.: US 10,312,779 B2
(45) Date of Patent: Jun. 4, 2019

(54) PUNCHING SHEET USED FOR MANUFACTURING ROTOR AND PERMANENT MAGNET MOTOR COMPRISING ROTOR

(71) Applicants: Zhongshan Broad-Ocean Motor Co., Ltd., Zhongshan (CN); Broad-Ocean Motor Ev Co., Ltd., Beijing (CN)

(72) Inventor: Mingming Hu, Zhongshan (CN)

(73) Assignees: ZHONGSHAN BROAD-OCEAN MOTOR CO., LTD., Zhongshan (CN); BROAD-OCEAN MOTOR EV CO., LTD., Beijing (CN)

( * ) Notice: Subject to any disclaimer, the term of this patent is extended or adjusted under 35 U.S.C. 154(b) by 250 days.

(21) Appl. No.: 15/214,410

(22) Filed: Jul. 19, 2016

(65) Prior Publication Data

US 2017/0033622 A1  Feb. 2, 2017

(30) Foreign Application Priority Data

Jul. 30, 2015  (CN) .................. 2015 2 0571335 U

(51) Int. Cl.
*H02K 15/03* (2006.01)
*H02K 1/27* (2006.01)
*H02K 29/03* (2006.01)

(52) U.S. Cl.
CPC ............ *H02K 15/03* (2013.01); *H02K 1/276* (2013.01); *H02K 29/03* (2013.01); *H02K 2213/03* (2013.01)

(58) Field of Classification Search
CPC ........ H02K 1/276; H02K 15/03; H02K 29/03; H02K 2213/03

USPC .................................................. 310/156.08
See application file for complete search history.

(56) References Cited

U.S. PATENT DOCUMENTS

| | | | | |
|---|---|---|---|---|
| 6,218,753 | B1* | 4/2001 | Asano ................... | H02K 1/276 310/156.53 |
| 6,844,652 | B1* | 1/2005 | Chu ...................... | H02K 1/276 310/156.53 |
| 9,705,366 | B2* | 7/2017 | Tanaka .................. | H02K 1/146 |
| 2003/0048024 | A1* | 3/2003 | Chu ...................... | H02K 1/276 310/156.45 |
| 2003/0218399 | A1* | 11/2003 | Iles-Klumpner ....... | H02K 1/276 310/156.53 |
| 2005/0023922 | A1* | 2/2005 | Araki ................... | H02K 1/2766 310/168 |
| 2008/0203842 | A1* | 8/2008 | Yoshikawa ............ | H02K 1/276 310/156.01 |
| 2008/0224558 | A1* | 9/2008 | Ionel .................... | H02K 1/276 310/156.57 |

(Continued)

*Primary Examiner* — Bernard Rojas
*Assistant Examiner* — Rashad H Johnson
(74) *Attorney, Agent, or Firm* — Matthias Scholl, PC; Matthias Scholl

(57) ABSTRACT

A punching sheet used for manufacturing a rotor, including an axle hole, an outer edge, and a plurality of mounting grooves for receiving permanent magnets. The axle hole is disposed at the center of the punching sheet, and the plurality of mounting grooves are disposed in the proximity of the outer edge of the punching sheet. The outer edge of the punching sheet includes a plurality of arcs which have equal length and are connected to one another, and a center of a circle corresponding to each arc deviates from the center of the axle hole.

8 Claims, 4 Drawing Sheets

(56) References Cited

U.S. PATENT DOCUMENTS

| | | | |
|---|---|---|---|
| 2010/0052455 A1* | 3/2010 | Feng | H02K 1/276 310/156.08 |
| 2010/0176682 A1* | 7/2010 | Kori | H02K 1/276 310/156.53 |
| 2010/0194228 A1* | 8/2010 | Lee | H02K 29/03 310/156.53 |
| 2011/0012465 A1* | 1/2011 | Kawamura | H02K 1/276 310/156.53 |
| 2011/0050022 A1* | 3/2011 | Li | H02K 1/276 310/156.46 |
| 2012/0104891 A1* | 5/2012 | Yamaguchi | H02K 1/276 310/156.53 |
| 2013/0057105 A1* | 3/2013 | Patterson | H02K 21/16 310/156.53 |
| 2013/0278106 A1* | 10/2013 | Kim | H02K 1/2766 310/156.53 |
| 2014/0001906 A1* | 1/2014 | Li | H02K 1/276 310/156.01 |
| 2014/0062243 A1* | 3/2014 | Falk | H02K 1/276 310/156.08 |
| 2014/0225471 A1* | 8/2014 | Kawanami | H02K 1/2706 310/156.53 |
| 2014/0354105 A1* | 12/2014 | Sedano Perez | H02K 1/276 310/156.53 |
| 2016/0285326 A1* | 9/2016 | Kawamura | H02K 1/276 |
| 2017/0018980 A1* | 1/2017 | Yang | H02K 29/03 |
| 2017/0085143 A1* | 3/2017 | Tanaka | H02K 1/146 |
| 2017/0104376 A1* | 4/2017 | Nakagawa | H02K 1/2773 |

\* cited by examiner

PUNCHING SHEET USED FOR MANUFACTURING ROTOR AND PERMANENT MAGNET MOTOR COMPRISING ROTOR

CROSS-REFERENCE TO RELATED APPLICATIONS

Pursuant to 35 U.S.C. § 119 and the Paris Convention Treaty, this application claims the benefit of Chinese Patent Application No. 201520571335.9 filed Jul. 30, 2015, the contents of which are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

Field of the Invention

The invention relates to a punching sheet used for manufacturing a rotor and a permanent magnet motor comprising the rotor.

Description of the Related Art

Typically, the counter electromotive force waveform and the cogging torque of the motor cannot be optimized synchronously, and the torque fluctuation of the motor is large.

SUMMARY OF THE INVENTION

In view of the above-described problems, it is one objective of the invention to provide a punching sheet used for manufacturing a rotor that has simple structure. The use of the punching sheet for manufacturing a rotor can produce a nonuniform air gap between the rotor and the stator. As a result, the counter electromotive force waveform of the motor is improved, and the cogging torque ripple and the torque fluctuation are reduced.

It is another objective of the invention to provide a permanent magnet motor comprising the rotor that has simple structure and smooth and steady operation.

To achieve the above objective, in accordance with one embodiment of the invention, there is provided a punching sheet used for manufacturing a rotor, comprising an axle hole, an outer edge, and a plurality of mounting grooves for receiving permanent magnets. The axle hole is disposed at a center of the punching sheet, and the plurality of mounting grooves are disposed in the proximity of the outer edge of the punching sheet. The outer edge of the punching sheet comprises a plurality of arcs which have equal length and are connected to one another, and a center of a circle corresponding to each arc deviates from a center of the axle hole.

In a class of this embodiment, suppose a circle takes the center of the axle hole as a center of a circle and is tangent to each of the arcs, a radius of the circle is R1, and a radius of the arcs is R2, then the relationship of the radius R1 and the radius R2 satisfies the formula: $0.7R1 \leq R2 \leq 0.9R1$.

In a class of this embodiment, two mounting grooves are disposed at an inner side of each arc on the punching sheet, and the two mounting grooves are distributed symmetrically along a radial centerline of the arc.

In a class of this embodiment, the punching sheet further comprises a plurality of magnetic isolating slots disposed between the axle hole and the mounting grooves.

In a class of this embodiment, a plurality of connecting ribs are formed between the plurality of magnetic isolating slots, and every two connecting ribs are crisscross.

The invention also provides a permanent magnet motor comprising a revolving shaft; a rotor assembly; a stator assembly; a housing; a front end cover; and a rear end cover. The rotor assembly comprises a rotor core and a plurality of permanent magnets disposed on the rotor core, the rotor core comprising plurality of punching sheets which are stacked up. The rotor assembly is disposed on the revolving shaft. The stator assembly and the housing are integrated and then sleeved on the rotor assembly. The front end cover and the rear end cover are disposed at two ends of the housing, respectively; and two ends of the revolving shaft are supported by bearings of the front end cover and the rear end cover, respectively.

Advantages of the punching sheet and the permanent magnet motor comprising the same are further illustrated hereinbelow.

1. The outer edge of the punching sheet comprises a plurality of arcs which have equal length and are connected to one another, and the center of a circle corresponding to each arc deviates from the center of the axle hole, so that the air gap between the rotor and the stator is nonuniform, thereby improving the counter electromotive force waveform of the motor and reducing the cogging torque ripple.

2. Experiments and tests show that, suppose a circle takes the center of the axle hole as a center of a circle and is tangent to each of the arcs, a radius of the circle is R1, and a radius of the arcs is R2, then the relationship of the radius R1 and the radius R2 satisfies the formula: $0.7R1 \leq R2 \leq 0.9R1$, which can ensure a good counter electromotive force waveform and can greatly reduce the cogging torque ripple.

3. A plurality of magnetic isolating slots are disposed between the axle hole and the mounting grooves. The arrangement of the magnetic isolating slots can lighten the punching sheet, and save the material costs to some extent.

4. A plurality of connecting ribs are formed between the plurality of magnetic isolating slots, and every two connecting ribs are crisscross, which enhances the connection strength and improves the reliability of the punching sheet.

BRIEF DESCRIPTION OF THE DRAWINGS

The invention is described hereinbelow with reference to the accompanying drawings, in which.

DETAILED DESCRIPTION OF THE EMBODIMENTS

For further illustrating the invention, experiments detailing a punching sheet used for manufacturing a rotor and a permanent magnet motor comprising the rotor comprising the same are described below. It should be noted that the following examples are intended to describe and not to limit the invention.

Example 1

Figure 1:
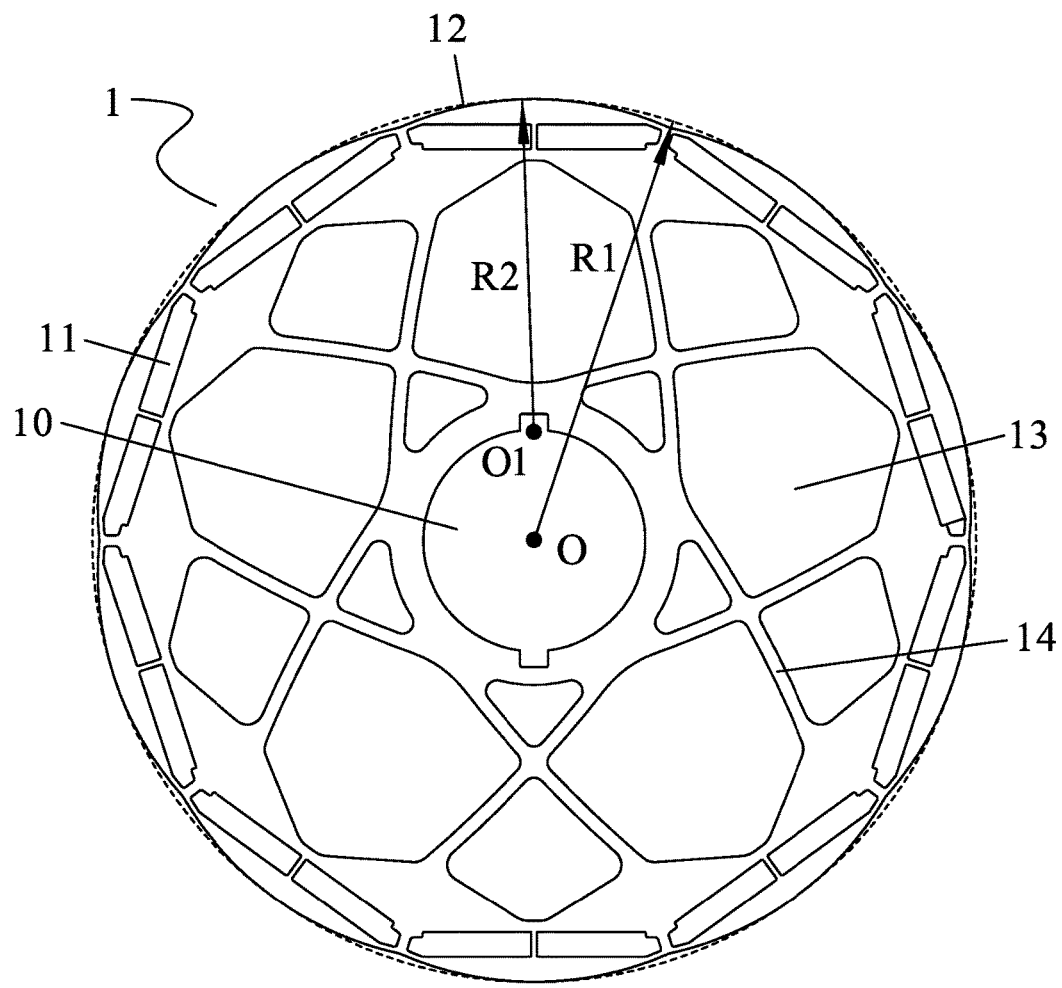
FIG. 1 is a schematic diagram of a punching sheet used for manufacturing a rotor in accordance with one embodiment of the invention.

As shown in FIG. 1, the invention provides a punching sheet 1 which is basic unit for manufacturing a rotor core of a rotor. The punching sheet 1 comprises an axle hole 10, an outer edge, and a plurality of mounting grooves 11 for receiving permanent magnets. The axle hole is disposed at the center of the punching sheet, and the plurality of mounting grooves are disposed in the proximity of the outer edge of the punching sheet. The outer edge of the punching sheet 1 comprises a plurality of arcs 12 which have equal length and are connected to one another, and a center of a circle O1 corresponding to each arc deviates from the center O of the axle hole. In this embodiment, the outer edge of the punching sheet comprises ten arcs 12. Suppose a circle takes the center O of the axle hole 10 as a center of a circle and is tangent to each of the arcs 12, the radius of the circle is R1, and the radius of the arcs 12 is R2, then the relationship of the radius R1 and the radius R2 satisfies the formula: $0.7R1 \leq R2 \leq 0.9R1$. For example, the radius of the circle is R1=79, the radius of the arcs 12 is R2=60, and then R2=0.7595 R1.

Two mounting grooves 11 are disposed at an inner side of each arc 12 on the punching sheet 1, and the two mounting grooves 11 are distributed symmetrically along a radial centerline of the arc 12.

The punching sheet 1 further comprises a plurality of magnetic isolating slots 13 disposed between the axle hole 10 and the mounting grooves 11. A plurality of connecting ribs 14 are formed between the plurality of magnetic isolating slots 13, and every two connecting ribs 14 are crisscross. Thus, five groups of crisscross connecting ribs 14 are formed and uniformly distributed along the circumference direction, which lightens the punching sheet and enhances the connection strength thereof.

Example 2

Figure 2:
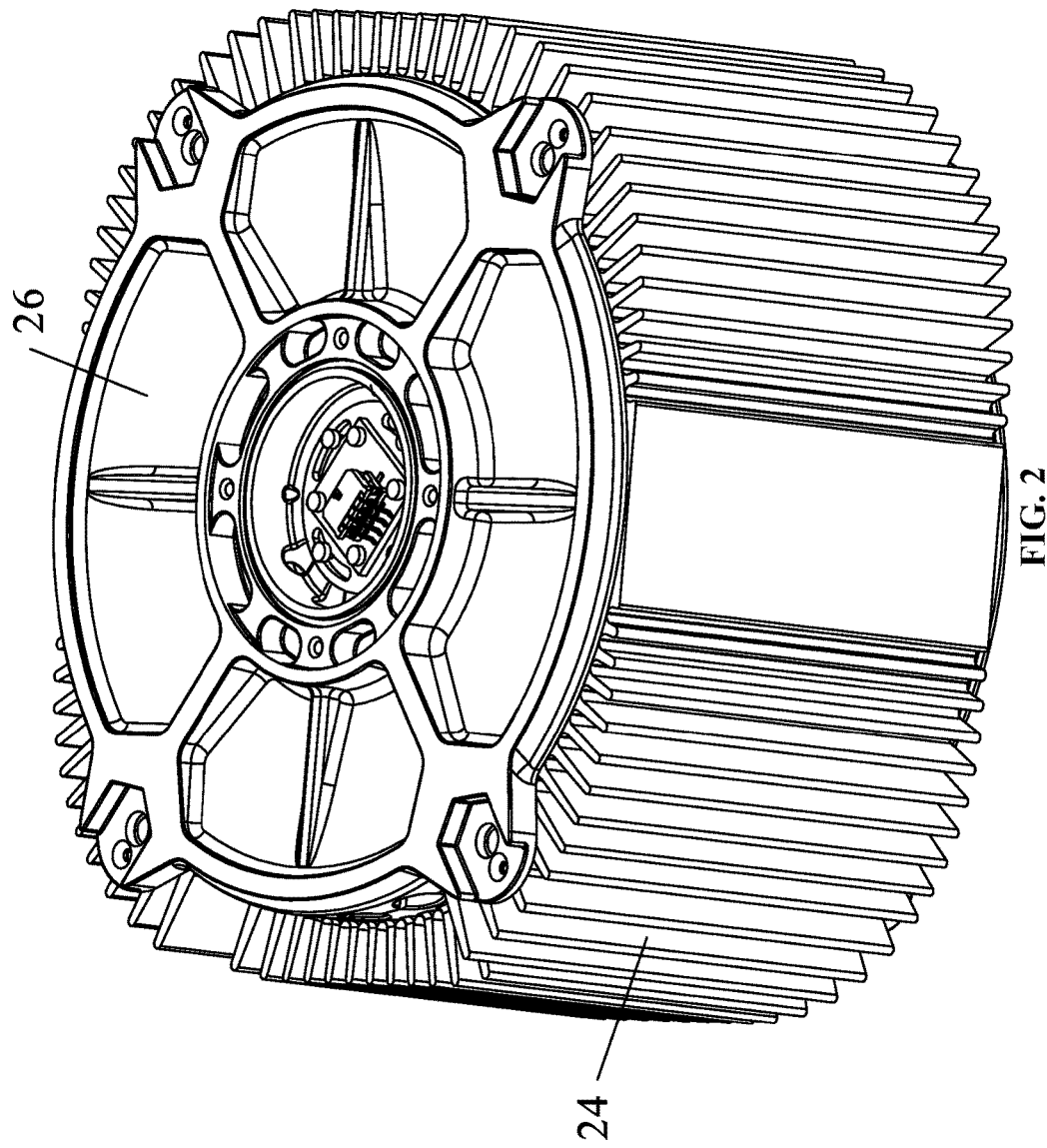
FIG. 2 is a stereograph of a permanent magnet motor in accordance with one embodiment of the invention.
Figure 3:
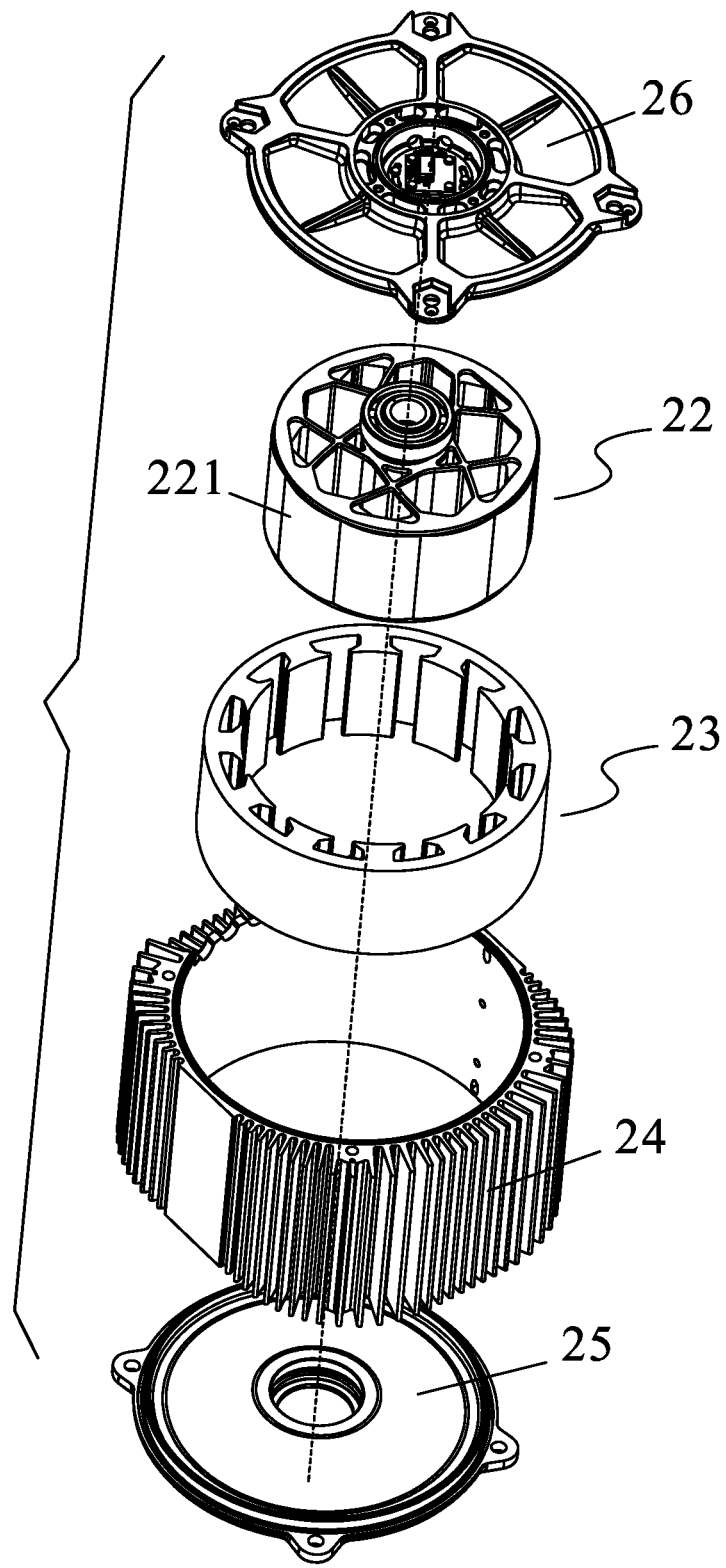
FIG. 3 is an exploded view of a permanent magnet motor in accordance with one embodiment of the invention.
Figure 4:
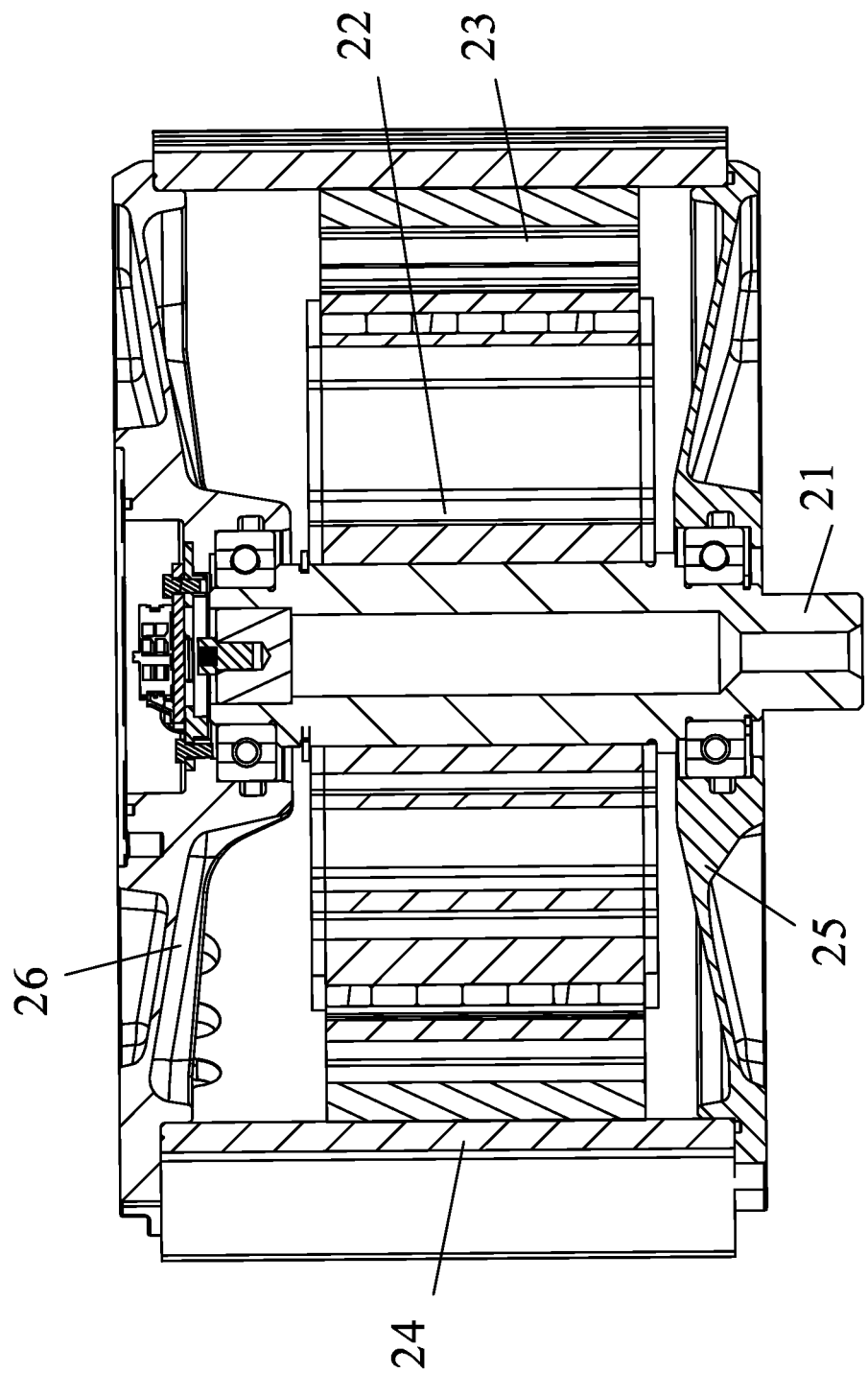
FIG. 4 is a schematic diagram of a permanent magnet motor in accordance with one embodiment of the invention.

As shown in FIGS. 2-4, the invention provides a permanent magnet motor comprising a revolving shaft 21, a rotor assembly 22, a stator assembly 23, a housing 24, a front end cover 25, and a rear end cover 26. The rotor assembly 22 comprises a rotor core 221 and a plurality of permanent magnets disposed on the rotor core 221, the rotor core comprising a plurality of punching sheets 1 which are stacked up. The rotor assembly 22 is disposed on the revolving shaft 21. The stator assembly 23 and the housing 24 are integrated and then sleeved on the rotor assembly 22. The front end cover 25 and the rear end cover 26 are disposed at two ends of the housing 24, respectively; and two ends of the revolving shaft 21 are supported by bearings of the front end cover 25 and the rear end cover 26, respectively. The punching sheets 1 are the same as that in Example 1.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A punching sheet used for manufacturing a rotor, comprising an axle hole, an outer edge, and a plurality of mounting grooves for receiving permanent magnets;
wherein
the axle hole is disposed at a center of the punching sheet, and the plurality of mounting grooves are disposed in the proximity of the outer edge of the punching sheet;
the outer edge of the punching sheet comprises a plurality of arcs;
the plurality of the arcs are connected to one another;
the plurality of arcs are of equal arc length and equal radius;
the plurality of arcs have a radius of R2;
a center of each of the plurality of arcs deviates from a center of the axle hole; and
a circle centered at the center of the axle hole and tangent to the plurality of arcs has a radius of R1, and $0.7R1 \leq R2 \leq 0.9R1$.

2. The punching sheet of claim 1, wherein two of the plurality of mounting grooves are disposed at an inner side of each of the plurality of arcs on the punching sheet, and the two of the plurality of mounting grooves are distributed symmetrically along a radial centerline of the each of the plurality of arcs.

3. The punching sheet of claim 1, further comprising a plurality of magnetic isolating slots disposed between the axle hole and the plurality of mounting grooves.

4. The punching sheet of claim 3, wherein a plurality of connecting ribs are formed between the plurality of magnetic isolating slots, and every two of the plurality of connecting ribs are crisscross.

5. A permanent magnet motor, comprising:
a) a revolving shaft;
b) a rotor assembly, the rotor assembly comprising a rotor core and a plurality of permanent magnets disposed on the rotor core, the rotor core comprising a plurality of punching sheets of claim 1 which are stacked up;
c) a stator assembly;
d) a housing;
e) a front end cover; and
f) a rear end cover;
wherein
the rotor assembly is disposed on the revolving shaft;
the stator assembly and the housing are integrated and sleeved on the rotor assembly;
the front end cover and the rear end cover are disposed at two ends of the housing, respectively; and
two ends of the revolving shaft are supported by bearings of the front end cover and the rear end cover, respectively.

6. The motor of claim 5, wherein two of the plurality of mounting grooves are disposed at an inner side of each of the plurality of arcs on the punching sheet, and the two of the plurality of mounting grooves are distributed symmetrically along a radial centerline of the each of the plurality of arcs.

7. The motor of claim 5, wherein the punching sheet further comprises a plurality of magnetic isolating slots disposed between the axle hole and the plurality of mounting grooves.

8. The motor of claim 7, wherein a plurality of connecting ribs are formed between the plurality of magnetic isolating slots, and every two of the plurality of connecting ribs are crisscross.

* * * * *